UNITED STATES PATENT OFFICE.

MAX STAHL, OF CHICAGO, ILLINOIS, ASSIGNOR TO THE WAHL-HENIUS RESEARCH LABORATORY, OF CHICAGO, ILLINOIS, A CORPORATION OF ILLINOIS.

ART OF PRODUCING CEREAL BEVERAGES.

1,421,737.      Specification of Letters Patent.      Patented July 4, 1922.

No Drawing.      Application filed January 2, 1920. Serial No. 348,780.

*To all whom it may concern:*

Be it known that I, MAX STAHL, a citizen of the United States, residing at Chicago, in the county of Cook and State of Illinois, have invented a new and useful Improvement in Art of Producing Cereal Beverages, of which the following is a specification.

The present invention relates to cereal beverages and more particularly to beverages produced by fermentation of worts produced from malted cereals wholly or in part, or from unmalted cereals and containing a very low proportion, or substantially no alcohol. It further relates to the production of carbonated cereal beverages of this class which will, in flavor, palatability, retention of flavor on exposure to air, life and foam-holding capacity resemble the higher alcoholic beverage beer.

In accordance with the present invention, the process steps employed are of the character of those employed in the art of brewing and the apparatus utilized is likewise the same as that commonly employed in the technology of brewing. By proper control of individual brewing steps, of proportions of materials used and of the fermentation a beverage low in alcohol may be produced which is utilized in admixture with a more highly fermented brew or beer from which the alcohol has been substantially removed to produce a beverage having the desired properties. In order to more conveniently indicate the steps of the present process I shall hereinafter indicate the low-alcoholic product above referred to as a checked fermentation product. The low alcohol or checked fermentation product may be made of any desired extract content and by utilizing the ordinary processes of the brewing art under suitable control. Thus, for the production of a beverage of approximately 5% Balling, an initial mash may be produced containing about 100 lbs. of malt for each barrel of water. A wort is prepared therefrom and is subjected to a boiling operation, during which a suitable quantity of hops are added thereto in the usual manner in hopping wort. Lactic acid is added to the wort at any stage in the process, but it is preferred that it be added during the boiling of the wort. I prefer to add the lactic acid in the form of a liquor of 2.4% acidity made according to the process described in the Wahl Patent No. 979,810 of December 27, 1910. The quantity of the lactic acid added should be, in any event, sufficient to produce an acidity of 0.05% in the final product.

The boiled wort may then be filtered and cooled and is subjected to a slow, controlled fermentation which is checked when only a very small proportion of alcohol has been produced, for example, when the exact reading has been reduced by 0.2% Balling corresponding to an alcohol content of about 0.1%. This may be effected by cooling the wort to a temperature of about 8.5° C., adding yeast (about 1½ lbs. for each 100 lbs. of malt used), and permitting the fermentation to proceed at such a temperature, for example 8.5–10° C., that the wort will ferment from 5% Balling to 4.8% Balling in from 24 to 48 hours. It is thereupon chilled to 0° C., run into a chip-cask, fined in the usual manner, and left in the cask under 10 pounds air pressure for not more than 48 hours. The beverage may then be carbonated and filtered in the usual manner. The alcohol content of the resulting liquid is less than 0.5% by volume.

The checked fermentation beverage thus produced may be used directly or may be admixed with a greater or less proportion of dealcoholized beer before or after the fermentation. The beer utilized is preferably one reading 4–5% Balling after fermentation when made from malt alone and should have an acidity of about 0.05%. This beer is dealcoholized by boiling to its original volume after the addition of about 30% of its volume of water, a small amount of hops being preferably added near the close of the boiling operation. The dealcoholized beer is chilled to 0° C. and may then be added in the desired proportions to the checked-fermentation beverage. The proportion of dealcoholized beer added to the checked fermentation product may be as high as 1 to 1 (50% of the total), although it is preferred that it be not higher than 1 to 4 (20% of the total).

The admixture of the beer with the checked fermentation product may likewise be effected prior to the fermentation of the latter during the boiling of the wort and in such manner that the dealcoholization is effected while the wort for the checked fermentation beverage is boiling. Thus, by adding the proper proportion of the beer to the wort in the kettle at intervals in fractional portions (for example, in the approximate proportions of 1 to 4), the dealcoholization of the beer may be effected simultaneously with the boiling of the wort. The combined wort and dealcoholized beer are then subjected to the checked fermentation.

The completed beverage, whether composed of the checked-fermentation beverage alone or an admixture thereof with dealcoholized beer, may be chill-proofed in the usual manner. It may then be carbonated, filtered and finished in the usual manner.

Although the present invention has been described in connection with certain specific embodiments thereof, and various details of procedure, time, temperature, etc., have been set forth, it is not intended that these details shall be regarded as limitations upon the invention except in so far as contained in the accompanying claims.

What I claim as new and desire to secure by Letters Patent is:

1. In the process of preparing low alcoholic cereal beverages, preparing a brew by subjecting a wort to controlled fermentation and checking the fermentation when the alcohol content reaches 0.3% to 0.7% and adding thereto dealcoholized beer.

2. In the process of preparing a low-alcoholic cereal beverage, the step which consists in adding to at least one part of a product of 4.8% Balling and 0.05% lactic acid acidity produced by controlled fermentation of a wort of approximately 5% Balling, one part of dealcoholized beer, and filtering and carbonating the mixture.

3. The process of preparing a low-alcoholic cereal beverage which consists in preparing a wort, boiling said wort and adding beer thereto while boiling, thereby driving off alcohol from the beer, cooling the boiled mixture and subjecting the cooled mixture to controlled fermentation.

4. The process of preparing a low-alcoholic cereal beverage which consists in preparing a wort, boiling said wort and adding beer thereto while boiling, thereby driving off alcohol from the beer, cooling the boiled mixture, fermenting the cooled mixture under controlled conditions and checking the fermentation before the alcohol content of the mixture reaches 0.5%.

5. The process of preparing a low alcoholic cereal beverage which consists in preparing a low gravity wort, subjecting it to controlled fermentation, checking the fermentation when the alcohol content reaches 0.1 to 0.5%, and adding thereto dealcoholized beer and lactic acid.

MAX STAHL.